Jan. 7, 1958   W. HAMMER   2,818,786
VISE FOR HOLDING WORKPIECES
Filed Nov. 22, 1954   2 Sheets-Sheet 1

INVENTOR
Wilhelm Hammer
By Bryant & Lowry
ATTYS.

Jan. 7, 1958 W. HAMMER 2,818,786
VISE FOR HOLDING WORKPIECES
Filed Nov. 22, 1954 2 Sheets-Sheet 2

INVENTOR
Wilhelm Hammer
By Bryant & Lowry
ATTYS.

United States Patent Office 2,818,786
Patented Jan. 7, 1958

2,818,786

VISE FOR HOLDING WORKPIECES

Wilhelm Hammer, Ingolstadt, Germany

Application November 22, 1954, Serial No. 470,495

Claims priority, application Germany November 25, 1953

8 Claims. (Cl. 90—60)

This invention relates to vises, and more particularly to a machine vise with parallel guides and screw spindle as clamping arrangement. The known vises of this type are open to the objection that the clamping forces are to a great extent taken up by the sticking of the guides and the friction of the screw spindle, with the result that the clamping forces of these machine vises are no longer capable of meeting the present day heavy machining requirements, particularly in the case of milling. The vises also have the disadvantage that the work lifts off its support when being chucked.

An object of the present invention is to eliminate said disadvantages and to provide a vise in which the work is clamped in toggle fashion by the rocking of an elbow lever suspended without guide in a jaw about its rocking edge, this elbow lever having a clamping face and a claw-like hooked foot, which hooked foot bears against an inclined abutment on the jaw and in rocking slides on this inclined abutment towards the workpiece. As the rocking edge is set back relatively to the clamping face the work is pulled down on to the support.

The jaw carrying the elbow lever is slidably mounted in a base plate and shifted towards the vise which is rigidly connected to the base plate, by means of one or several continuous screw spindles.

In another form of construction the jaw is rigidly connected to the base plate whereas a counter-jaw is slidable in the base plate and can be displaced in teeth of one or more continuous racks.

In both forms of construction the rocking of the clamping elbow lever is effected by an eccentric which can be locked by a locking gear. It forms part of the invention that the racks are shiftable in the base plate and the pitch of the teeth is bridged by a short length of thread with a nut, so that it is possible to bring the jaw against the work by hand against the action of one or several springs. The eccentric which rests on a shoe of the jaw is organically connected thereto by links.

Finally it is proposed according to the invention to provide the racks with teeth on their undersides and to effect the engagement of the teeth of the jaw by a projecting shoe like a bearer.

Two preferred embodiments of the invention are illustrated by way of example in the accompanying drawings, in which.

Fundamentally the subject matter of the invention consists of an elbow lever $a$ with a claw-like hooked foot $b$ which bears against an inclined abutment or counter bearing $c$ of a jaw $i$. The elbow lever $a$ forms a clamping face $e$ and a rocking edge $d$. The rocking edge $d$ is set back relatively to its clamping face $e$ which is preferably convex. When a setting movement is initiated the elbow lever $a$ rocks on its edge $d$ and tightly clamps the work. This clamping movement is increased in that the hooked foot $b$ slides on an inclined plane $f$ on the clamping element $i$. Owing to the bearing or rocking edge $d$ being set back the elbow lever $a$ carries out a kind of bowing movement at the clamping point and draws the work at the same time on to its support because the hooked foot $b$ abuts against the inclined plane $f$ in upward direction. The rocking of the elbow lever $a$ is effected by an eccentric $x$ carrying a handle $m$.

The position of the rocking edge $d$ and the size of the sliding angle can be adjusted so that a maximum clamping effect is attained in the horizontal and also in the vertical direction.

By the fourfold transmission ratio of the elbow lever $a$ a clamping force of hitherto unknown strength is exerted. The dynamics of the transmission are determined by an angle of glide $\alpha$, the length of the elbow lever $a$, the stroke of the clamping eccentric $x$ and the length of its handle $m$.

The loosely inserted elbow lever $a$ can be removed in a simple manner if necessary, to remove chips for example.

Figure 1:
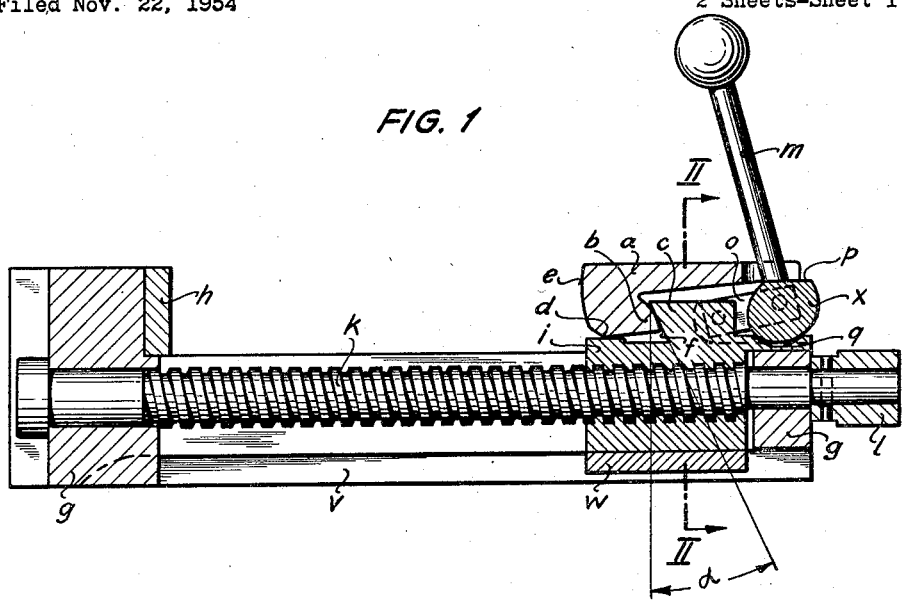
Fig. 1 is a longitudinal section through a vise with movable jaw or clamping element and rigid counter jaw or bearing.
Figure 3:
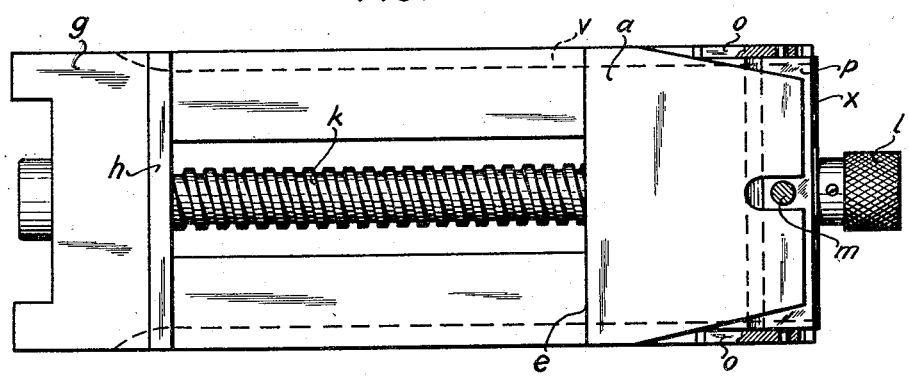
Fig. 3 is a top plan view of the vise.
Figure 2:
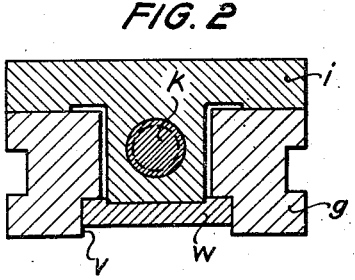
Fig. 2 is a cross-section on line A—A of Fig. 1.
Figure 4:
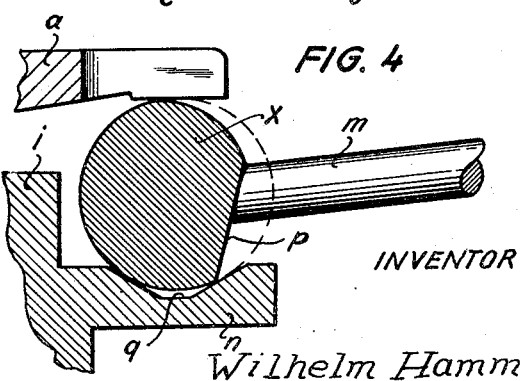
Fig. 4 shows a locking gear partly in cross-section.

The vise illustrated in Figs. 1 to 4 consists substantially of a base plate $g$, a rigid counter bearing $h$ and the movable clamping element $i$. When the elbow lever $a$ and the work have been placed in position the clamping element $i$ is brought to the work by turning a screw spindle $k$ with the aid of a knurled sleeve $l$ on the clamping element $i$. The clamping element $i$ remains in this position for all similar workpieces. The clamping is now effected by merely operating the eccentric $x$ by means of the handle $m$. The eccentric $x$, which rests on a shoe $n$ of the clamping element $i$, is movable through the intermediary of links $o$ and mechanically connected to the clamping element $i$ by these links $o$. The clamping eccentric $x$ is provided with a surface $p$ so that, when the elbow lever $a$ is in disengaged position, the largest possible jaw gap can be attained for easily introducing the work. The clamping eccentric $x$ rests in a prism shaped recess $q$ in the shoe $n$ of the clamping element $i$. In its lowermost position the eccentric $x$ rests in this prism shaped recess $q$ with its surface $p$ beyond the tangent of the prism and is therefore reliably locked.

Figure 5:
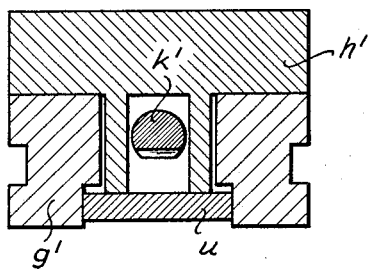
Fig. 5 is a cross-section on line B—B of Fig. 6.
Figure 7:
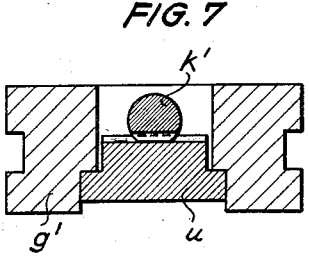
Fig. 7 is a cross-section on line C—C of Fig. 6.
Figure 6:
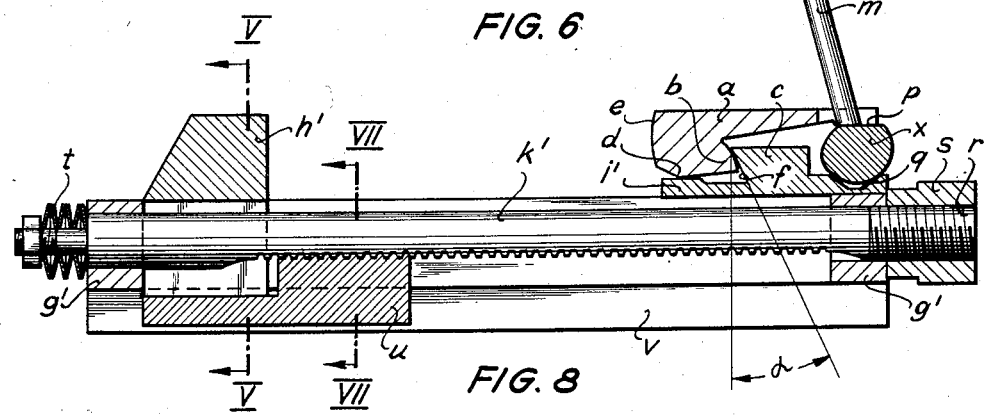
Fig. 6 shows in longitudinal section a vise with rigid jaw or clamping element and movable counter jaw or bearing.
Figure 8:
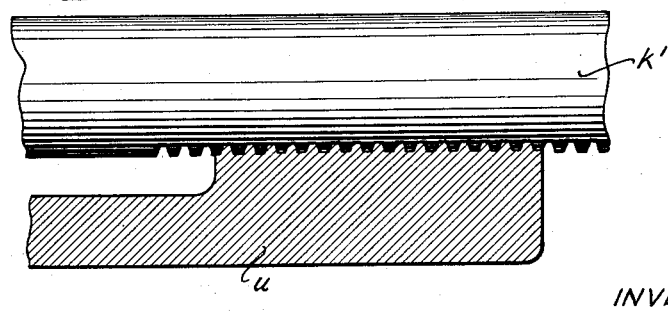
Fig. 8 shows a toothed locking arrangement in part longitudinal section.

The vise illustrated in Figs. 5 to 8 consists substantially of a base plate $g'$, a movable counter bearing $h'$ and a solid clamping element $i'$. In this instance continuous tension anchors $k'$ are provided. These tension anchors $k'$ have no screw thread but are constructed as toothed racks so as to allow rapid adjustment of the movable counter bearing $h'$. As, however, the eccentric has a stroke which is smaller than a tooth pitch, this rack, in order to bridge this difference, should also have a short screw threaded length $r$ on its projecting end, on which screw thread a knurled nut $s$ is mounted. The screw threaded length $r$ must therefore be at least as long as a tooth pitch. It is thus possible by turning the knurled nut $s$ to shift the toothed rack $k'$ and therefore the counter bearing $h'$ against the action of one or more springs $t$. When the clamping lever $a$ and the workpiece have been placed in position the counter bearing $h'$ is first moved to the workpiece by shifting the point of engagement of the teeth in the rack $k'$. Thereupon the rack $k'$ and with it the counter bearing $h'$ are brought against the workpiece and the clamping lever $a$ by turning the knurled nut $s$. The clamping is then effected merely by the eccentric $x$ in the manner already described.

To prevent any milling chips or the like from dropping into the teeth these are formed on the under side of the toothed rack $k'$. This arrangement also presents the advantage that a toothed rack segment $u$ can be fitted like a shoe in front of the movable counter bearing $h'$ like a bearer, with the result that also in this case the workpiece is kept down during the chucking operation.

The parallel guiding of the movable elements $i$ and $h'$ in the base plates $g$ and $g'$ respectively is effected by a cover plate $w$ and by the toothed rack segment $u$ respectively which slide in guides $v$ both of which are screwed on to their respective clamping elements.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A vise for workpieces comprising the combination of a stationary clamping element and a movable clamping element, means for drawing said elements together for clamping a workpiece therebetween, one of said clamping elements having an inclined abutment portion on the inner face thereof, an unguided elbow lever tiltingly and freely mounted on said last mentioned clamping element adacent the abutment portion thereof, said lever having a clamping face and a claw-like foot element, said foot element in turn having an arcuate surface in bearing engagement with and slidable along the inclined abutment portion of the said clamping element during the tilting of said elbow lever on said clamping element, and means for tilting said elbow lever on said clamping element through a predetermined angle and into engagement with a workpiece.

2. A vise as claimed in claim 1, wherein the elbow lever has a tilting edge in contact with the clamping element at a point intermediate the clamping face of the lever and the arcuate surface thereof.

3. A vise as set forth in claim 1, wherein the lever is mounted on the movable clamping element, said movable clamping element also having said inclined abutment portion.

4. A vise as set forth in claim 3, wherein the elbow lever has a tilting edge in contact with the clamping element at a point intermediate the clamping face of the lever element and the arcuate surface thereof.

5. A vise as set forth in claim 3, wherein the means for tilting said elbow lever includes a manually operable eccentric mounted coaxially with the tiltable edge of said elbow lever on said clamping element.

6. A vise as set forth in claim 4, wherein the eccentric is movable in a prismatic recess in the clamping element.

7. A vise as set forth in claim 4, wherein the manually operable eccentric is pivotally linked and connected to said clamping element.

8. A vise as set forth in claim 4, including a base plate, and means slidably mounting said clamping element in said base plate, said last mentioned means including a continuous screw spindle.

References Cited in the file of this patent

UNITED STATES PATENTS

| | | |
|---|---|---|
| 63,929 | Morse | Apr. 16, 1867 |
| 999,979 | Fisher | Aug. 8, 1911 |
| 1,490,063 | Tower | Apr. 8, 1924 |